United States Patent [19]
Kushigian

[11] 3,972,407
[45] Aug. 3, 1976

[54] TRANSFER MECHANISM FOR ROUND PARTS

[76] Inventor: Anthony Kushigian, 9 Pine Lake Drive, Etowah, N.C. 28729

[22] Filed: Feb. 3, 1975

[21] Appl. No.: 546,684

[52] U.S. Cl............................ 198/20 R; 198/69; 198/225; 214/6 BA; 221/257
[51] Int. Cl.². ................. B65G 47/00; B65G 25/08
[58] Field of Search.............. 198/20 R, 22 R, 24, 198/35, 26, 47, 54, 56, 59, 69, 219, 218, 221, 225, 227, 82; 221/256, 257, 178; 214/6 TS, 6 BA, 17 C, 17 R, 17 A; 271/212

[56] References Cited
UNITED STATES PATENTS

| | | | |
|---|---|---|---|
| 2,297,730 | 10/1942 | Turnock et al. | 198/225 |
| 2,335,670 | 11/1943 | Harvey | 198/225 |
| 2,453,977 | 11/1948 | Eames | 198/218 |
| 2,744,369 | 5/1956 | Seragnoli | 214/6 BA |
| 3,342,350 | 9/1967 | Seragnoli | 214/6 BA |
| 3,604,435 | 9/1971 | Day et al. | 198/219 |

*Primary Examiner*—John J. Love
*Assistant Examiner*—Joseph E. Valenza
*Attorney, Agent, or Firm*—Barnes, Kisselle, Raisch & Choate

[57] ABSTRACT

A transfer mechanism for transferring a round part such as a drill from a first station to a second station with intermediate accumulating storage wherein a horizontally reciprocating slide has a pair of horizontally displaced transverse V-shaped grooves. With the slide extended, one of the grooves receives a part from the first station while the second groove receives a part from the storage hopper. When the slide is retracted, the part in the second groove is transferred to the second station and the part in the first groove is transferred to the hopper. Pivoted gate fingers at the hopper move the part from the first groove into the hopper when the slide is again extended. By using only one groove in the slide, the transfer mechanism can be used for an unloading operation only, that is, transferring a part from a machining station to the hopper.

16 Claims, 6 Drawing Figures

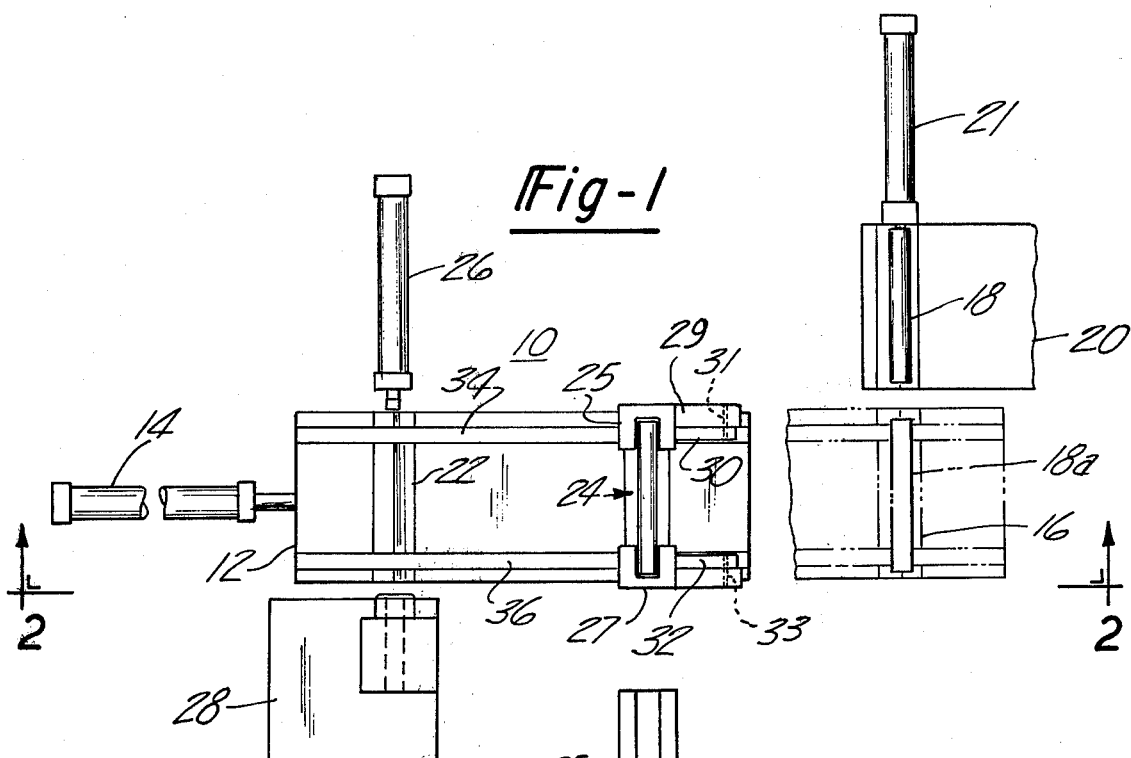
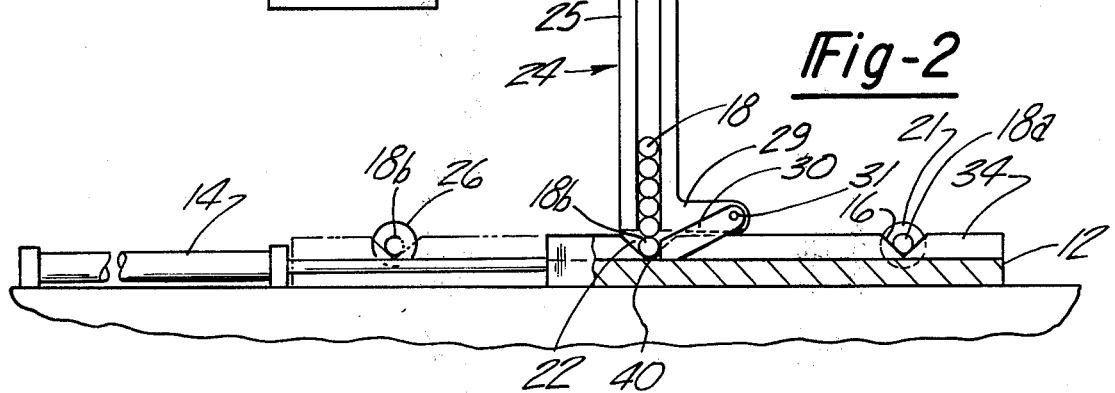
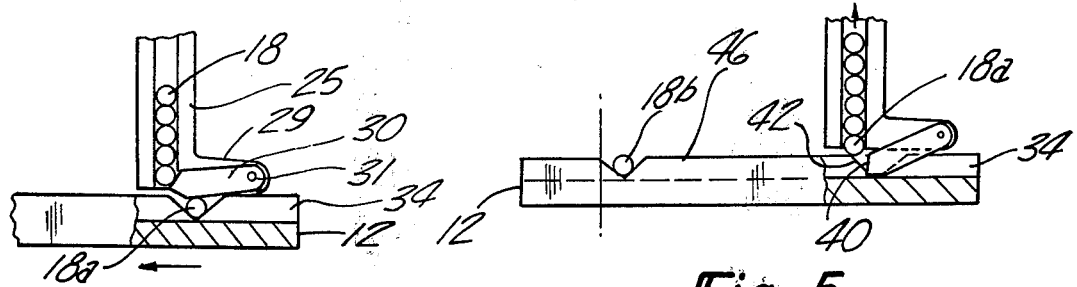
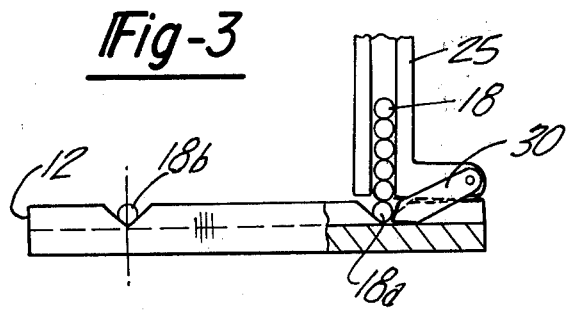
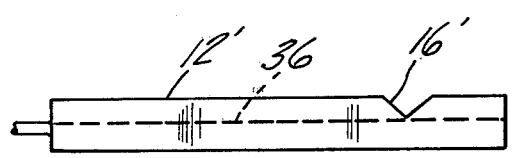

TRANSFER MECHANISM FOR ROUND PARTS

The present invention relates to a transfer mechanism particularly suited for round parts to unload parts from a first work station and move the parts to a hopper either with or without simultaneous transfer of parts from the hopper to the second work station.

The objects of this invention are to provide a transfer mechanism of the aforementioned type that is simple yet rugged in construction and low in cost; and/or that operates reliably and effectively to either transfer parts from a work station to storage and from storage to a different work station, or only from the work station to storage.

Other objects, features and advantages of the present invention will become apparent in connection with the following description, the appended claims and the accompanying drawings in which:

FIG. 1 is a top view of the transfer mechanism of the present invention with the slide in a retracted position;

FIG. 2 is a front elevational view taken generally in the direction of arrows 2—2 in FIG. 1, with parts of the slide broken away and in section and with the slide moved to its extended position;

FIGS. 3, 4 and 5 are fragmentary vertical sections through the slide at the hopper to better illustrate how parts are transferred into and out of the hopper; and FIG. 6 is a front view of a modified slide for transferring parts from a station into a hopper.

Referring to the drawings in greater detail, the transfer mechanism 10 of the present invention generally comprises a horizontally reciprocal slide 12 actuated by a cylinder 14 for movement between an extended position (the right-hand position illustrated in broken lines in FIG. 1) and a retracted position (the left-hand position illustrated in full lines in FIG. 1). Slide 12 has a first V-shaped transverse groove 16 located to receive a round part such as a drill 18a from a first work station 20 when the slide is in its extended position. At the completion of a machining operation at station 20, drill 18a is loaded into groove 16 by suitable means such as a cylinder 21 aligned with groove 16 to push drill 18a horizontally into groove 16. Suitable stops (not shown) insure that drill 18a is properly located longitudinally of groove 16 by cylinder 21. Slide 12 also has a second transverse V-shaped groove 22 horizontally displaced from groove 16 and disposed beneath a hopper 24 to receive a different drill 18b when slide 12 is in its extended position. Hopper 24 comprises a pair of opposed, upstanding U-shaped channels 25, 27 open at their lower ends to receive drills 18 from and dispense drills 18 to slide 12.

When slide 12 is retracted to its left-most position illustrated in full lines in FIG. 1, groove 22 moves into alignment with a third cylinder 26 that pushes drill 18b out of groove 22 and into a second work station 28 for a subsequent machining operation. Simultaneously, when slide 12 is shifted to its retracted position, drill 18a from station 20 is transferred past a pair of pivoted gate fingers 30, 32 to a location beneath hopper 24. Fingers 30, 32 are mounted at the base 29 of hopper 24, in front of the lower open end of the hopper, as by pins 31, 33, so as to be pivotal in a generally vertical direction, upwardly and rearwardly in a clockwise direction as viewed in FIG. 2. Fingers 30, 32 normally extend downwardly and rearwardly into respective longitudinal slots 34, 36 in slide 12. Slots 34, 36 intersect grooves 16, 22. In the embodiment being described, fingers 30 are biased to their downward position into slots 34, 36 by gravity, but suitable spring biasing could be provided to resiliently urge the fingers into the slots. When cylinder 14 is again actuated and slide 12 is reextended, fingers 30, 32 force drill 18a into hopper 24. Since drill 18a moves the same distance from station 20 to hopper 24 as drill 18b moves from hopper 24 to station 28, it will be apparent that the hopper 24 is located midway between stations 20, 28. Suitable automatic controls can be easily provided for cylinders 14, 21 and 26.

The construction of transfer mechanism 10 will be more readily understood in connection with the description of FIGS. 2–5. With cylinder 14 extended and slide 12 extended to the right-hand position shown in full lines in FIG. 2, drill 18a will be disposed in groove 16 and drill 18b will be disposed in groove 22. When the cylinder 14 is retracted and slide 12 retracts toward the left, drill 18a moves underneath fingers 30, 32 and cams the fingers 30, 32 upwardly as illustrated in FIG. 3. When slide 12 reaches its left-hand position with drill 18a aligned with hopper 24, drill 18a has moved past the free end of fingers 30, 32 and the fingers drop back into slots 34, 36 behind drill 18a as shown in FIG. 4. With slide 12 in its retracted position, drill 18b can be transferred from groove 22 into work station 28 so that groove 22 can receive another drill 18 from hopper 24 during the next cycle. As shown in FIGS. 4 and 5, when slide 12 shifts toward the right from its retracted position, drill 18a butts against end faces 40 on fingers 30, 32; and with further movement of slide 12, the fingers cause drill 18a to ride up the inclined rear face 42 of groove 16 and into the hopper 24. As drill 18a is pushed into the hopper, the other drills in the hopper are also pushed upwardly. Continued movement of slide 12 toward its extended position shifts an empty groove 16 into registry with cylinder 21 to receive another drill from work station 20. Hence fingers 30, 32 serve as a gate that opens to pass drills in one direction to hopper 24 but blocks drills from moving in the opposite direction away from the hopper. As slide 12 continues toward the right, the bottom drill 18a in hopper 24 will slide or roll on the top face 46 of the slide and then drop into groove 22, assuming it is empty, when the slide is fully extended.

FIG. 5 also illustrates a situation where drill 18b remains in groove 22 and hence is moved back to hopper 24. This can occur where the machining stations 20, 28 do not operate at the same speed or where station 28 is down. Hence if drill 18b is moved to the station 28 but the station is not ready to receive the drill, drill 18b remains in groove 22 and is returned to the hopper. The drill 18b will slide underneath the other drills 18 in the hopper for transfer back to station 28 on the next transfer cycle. Drills can be removed from work station 20 and transferred into hopper 24 with each reciprocation of the slide 12 regardless of whether a drill is also being removed from hopper 24 for transfer to station 28. If one drill is moved from station 20 to hopper 24 and a drill is returned to the hopper from station 28, the hopper will have one more drill than when the sequence started. Hence in the two-station embodiment being described, the transfer mechanism has an accumulating storage function to allow for buildup of drills at hopper 24. Additionally, as long as hopper 24 contains a supply of drills, drills can be transferred to station 28 even though drills are not being received from station 20. This accumulating storage allows for down time at either of the stations 20, 28 and for different machining times at the respective stations.

Although a particular transfer arrangement has been disclosed, it will be apparent that several modifications are contemplated by the present invention. Although a single pair of gate fingers 30, 32 has been disclosed, preferably more than two gate fingers and associated longitudinal slots in the slide 12 are used at locations spaced transversely across the slide to insure that a drill is moved out of groove 16 regardless of the length of the drill or its exact location longitudinally of groove 16. Additionally, the use of more gate fingers insures proper operation when the same transfer device is used with drills of different lengths. The present invention could be used with parts other than round cylindrical parts, although it is particularly suited for round parts for groove-to-hopper feed by the fingers 30, 32. The use of V-shaped grooves to receive parts on the slide is a simple and effective arrangement for loading and unloading, particularly with round parts.

Although the preferred embodiment of the present invention has been disclosed for transferring parts between a first and second machining station with intermediate storage, the present invention is also particularly useful as an unloader only, that is, to transfer parts from a single machining station to a hopper for storage or periodic removal from the hopper. For the "unload only" function, slide 12 is modified as shown by the slide 12' in FIG. 6 wherein the rear groove has been eliminated and only a forward groove 16' is used. Of course, for an unload only function, cylinder 26 and station 28 would not be present. The structure and operation of a transfer mechanism using the modified slide 12' to transfer a drill from a work station to a hopper will be readily apparent in view of the description hereinabove in connection with FIGS. 1–5. With the construction described hereinabove, slides 12, 12' can be a single unitary part or of one-piece construction. Except for the slide 12 or 12', the other parts of the transfer mechanism can be interchangeable for either the unload only or station-to-hopper-to-station application. Although a simple hopper has been disclosed, various other hopper constructions will be apparent.

It will be understood that a transfer mechanism for round parts has been described hereinabove for purposes of illustration and is not intended to indicate limits of the present invention, the scope of which is defined by the following claims.

I claim:

1. A transfer mechanism for moving parts between first and second locations comprising a slide mounted for reciprocal movement in a first plane between first and second positions, first part receiving means on said slide to receive a first part from said first location when said slide is in said first position, actuating means for moving said slide in a first direction in said first plane from said first position to said second position and in an opposite direction in said first plane from said second position to said first position, said receiving means being at said first location when said slide is in its first position and at said second location when said slide is in its second position, and one-way gate means mounted adjacent said second location for allowing said first part in said receiving means to pass to said second location when said slide is moving in said first direction and, when said slide is moving in said opposite direction, for blocking movement of said first part in said receiving means back to said first location and, in response to movement of said part toward said first location, for causing said first part to move in a direction transverse to said first plane out of said receiving means so that said part remains at said second location when said receiving means returns to said first location.

2. The transfer mechanism set forth in claim 1 wherein said gate means comprises a member yieldably movable in response to engagement with said part when said part moves through said gate means in said first direction, said member remaining stationary when said slide moves in said opposite direction to engage said part and cause said part to move in said transverse direction out of said part receiving means.

3. The transfer mechanism set forth in claim 1 wherein said first plane is a horizontal plane, said slide is horizontally reciprocal, said transverse direction is generally vertical, and wherein said part receiving means comprises a first groove in said slide extending transversely of said slide and opening upwardly of said slide to deliver a part to said second location, and wherein said gate means comprises finger means for trapping said part between said finger means and a wall of said groove such that when said slide is moved in said opposite direction said part is cammed upwardly out of said groove by said finger means and said wall of said groove.

4. The transfer mechanism set forth in claim 1 wherein said groove also opens outwardly at a side of said slide to receive a part at said first location, and wherein said part is a round cylindrical part having a longitudinal axis and said first location includes loading means to move said part in a direction along its axis into said groove.

5. The transfer mechanism set forth in claim 1 wherein said groove has a generally V-shaped section in a vertical plane extending in the direction of reciprocal movement of the slide so that when said finger means blocks movement of said part in said opposite direction, said finger means causes said part to ride upwardly on said one wall of said groove and out of said groove.

6. The transfer mechanism set forth in claim 1 wherein said second location includes a hopper having an open lower end disposed immediately above said groove when said slide is in said second position, and wherein said slide has a top face that extends from said part receiving means to said second location adjacent said lower open end of said hopper when said slide is in its first position, said top face being immediately below said lower open end of said hopper so that the lowermost part in said hopper is held in said hopper by said top face when said slide moves from said second position to said first position.

7. The transfer mechanism set forth in claim 3 wherein said finger means is mounted for pivotal movement in a vertical plane, a slot extending longitudinally of said slide and intersecting said groove, said finger means riding in said slot when said finger means is in a lowered position and being arranged to be pivoted upwardly and generally in said first direction when said finger means is engaged by said part in said groove as said part enters said second location, said finger means being further arranged and constructed to return to its lowered position when said part is at said second location and to engage said part when said slide is moved in said opposite direction and cause said part to move out of said groove.

8. The transfer mechanism set forth in claim 7 wherein said gate means includes a second gate finger spaced from said first-mentioned finger means transversely of said slide and pivotally mounted and arranged to ride in a second longitudinal slot in said slide in the same manner as said first-mentioned finger means.

9. The transfer mechanism set forth in claim 7 wherein said part is a round cylindrical part having a longitudinal axis and wherein said first location is a work station comprising loading means to move said part horizontally in a direction along its axis into said groove and wherein said second location comprises part storage means disposed immediately above said slide to receive a part from said first part receiving means when said slide is in its second position and said finger means causes said part to move out of said first part receiving means.

10. The transfer mechanism set forth in claim 1 for also moving parts between said second location and a third location, said second location being an accumulating storage station, second part receiving means on said slide to receive a second part from said second location when said slide is in said first position, said second part receiving means being movable in unison with said first part receiving means when said slide is moved in said first direction to thereby transfer said second part from said second location to said third location while said first part is being transferred from said first location to said second location.

11. The transfer mechanism set forth in claim 10 wherein said slide is horizontally reciprocal, said first part receiving means comprises a first groove in said slide extending transversely of said slide and opening upwardly of said slide to deliver a part to said location, and wherein said second part receiving means comprises a second transverse groove in said slide spaced from said first groove and opening upwardly of said slide to receive a part at said second location.

12. The transfer mechanism set forth in claim 11 wherein said slide is horizontally reciprocal, said part is a round cylindrical part having a longitudinal axis, said first groove opens outwardly at a side of said slide to receive a part at said first location, said first location includes means to move a part horizontally in a direction along its axis from said first location into said first groove, said second groove opens outwardly at a side of said slide to deliver a part at said third location and wherein said third location includes unloading means to move a part horizontally in a direction along its axis out of said second groove.

13. The transfer mechanism set forth in claim 11 wherein said gate means includes a finger mounted for pivotal movement in a vertical plane, a slot extending longitudinally of said slide and intersecting said first and second grooves, said finger riding in said slot when said finger is in a lowered position and being arranged to pivot upwardly and generally in said first direction when said finger is engaged by said first part in said first groove as said first part enters said second location, said finger being further arranged and constructed to return to its lowered position when said part is at said second location to engage said first part when said slide is moved in said opposite direction and cause said part to move out of said first groove.

14. The transfer mechanism set forth in claim 13 wherein said first groove has a generally V-shaped section in a vertical plane extending in the direction of reciprocal movement of the slide so that when said gate finger blocks movement of said part in said opposite direction, said part rides upwardly on a rear wall of said groove and out of said groove.

15. In combination, a first work station for processing cylindrical round parts having a longitudinal axis, unloading means at said first station for moving said part horizontally in a direction along its axis onto a transfer mechanism, said transfer mechanism comprising a horizontally reciprocal slide movable between a forward position and a rearward position, said slide having a transverse groove therein open at one end in alignment with said first unloading means to receive a part therefrom when said slide is in its forward position, said groove also opening upwardly at a top face of said slide, actuating means for moving said slide between its forward and rearward positions to move a part in said groove to a storage hopper horizontally displaced from said first station, said hopper having an opening disposed immediately above said groove to receive a part therefrom when said slide is in its rearward position, said slide having a slot extending longitudinally thereof and intersecting said groove, a finger pivotally mounted adjacent to and forwardly of said hopper opening and arranged to ride in said slot when said finger is in a lowered position, said finger being engaged by said part in said groove as said part approaches said hopper to pivot said finger upwardly and rearwardly so that said part is carried beneath said finger to said hopper, said finger returning to its lowered position when said part is beneath said hopper opening and being arranged and constructed to engage said part and cause said part to be delivered from said groove to said hopper opening when said slide is moved from its rearward position toward its forward position.

16. The transfer mechanism set forth in claim 15 for also moving parts from said hopper to a second work station, a second transverse groove on said slide opening upwardly of said slide and outwardly of said slide at a side thereof, said second groove being disposed beneath said hopper opening when said slide is in its forward position to receive a part from said hopper, second unloading means at said second work station aligned with said second groove when said slide is in its rearward position to remove a part from said second groove.

* * * * *

UNITED STATES PATENT OFFICE
CERTIFICATE OF CORRECTION

PATENT NO. : 3,972,407
DATED : August 3, 1976
INVENTOR(S) : Anthony Kushigian

It is certified that error appears in the above-identified patent and that said Letters Patent are hereby corrected as shown below:

Column 3, line 33, insert quotation marks around the words "unload only", i.e., --"unload only"--.
Column 3, line 43, insert quotation marks around the words "unload only", i.e., --"unload only"--.
Column 4, line 30, delete "1" and insert --3--.
Column 4, line 37, delete "1" and insert --3--.
Column 4, line 45, delete "1" and insert --3--.

Signed and Sealed this

First Day of November 1977

[SEAL]

Attest:

RUTH C. MASON
Attesting Officer

LUTRELLE F. PARKER
Acting Commissioner of Patents and Trademark